(12) United States Patent
Struik

(10) Patent No.: US 11,323,421 B2
(45) Date of Patent: *May 3, 2022

(54) METHOD AND APPARATUS FOR ENCODING SECURITY STATUS INFORMATION

(71) Applicant: BlackBerry Limited, Waterloo (CA)

(72) Inventor: Marinus Struik, Toronto (CA)

(73) Assignee: BlackBerry Limited, Waterloo (CA)

( * ) Notice: Subject to any disclaimer, the term of this patent is extended or adjusted under 35 U.S.C. 154(b) by 81 days.

This patent is subject to a terminal disclaimer.

(21) Appl. No.: 16/872,119

(22) Filed: May 11, 2020

(65) Prior Publication Data

US 2020/0274857 A1     Aug. 27, 2020

Related U.S. Application Data

(60) Continuation of application No. 16/113,518, filed on Aug. 27, 2018, now Pat. No. 10,673,829, which is a
(Continued)

(51) Int. Cl.
*H04L 29/06*     (2006.01)
*H04L 1/18*      (2006.01)
(Continued)

(52) U.S. Cl.
CPC ........ *H04L 63/0428* (2013.01); *H04L 1/1803* (2013.01); *H04L 1/1812* (2013.01);
(Continued)

(58) Field of Classification Search
CPC . H04L 63/0428; H04L 63/0435; H04L 63/06; H04L 1/1803; H04L 1/1812;
(Continued)

(56) References Cited

U.S. PATENT DOCUMENTS 4,030,072 A     6/1977 Bjornsson
5,265,103 A    11/1993 Brightwell
(Continued)

OTHER PUBLICATIONS

"Adding the Freshness on the Control Message Packet"; Project: IEEE 802-15 Working Group for Wireless Personal Are Networks (WPANS); Online May 2002, XP002280536; Retrieved from the internet: May 14, 2004 <http://grouper.ieee.org/groups/802/15/pub/2002/May2002/02222r0P802-15_TG4-Helicomm_Security_Proposal.ppt>, 13 pages.

(Continued)

*Primary Examiner* — Azizul Choudhury
(74) *Attorney, Agent, or Firm* — Fish & Richardson P.C.

(57) ABSTRACT

A method of transmitting messages from a sender to a recipient over a wireless channel, the messages including a sequence counter and a frame counter. The method comprises establishing initial values of the sequence counter and the frame counter at the sender. Initial values of the frame counter and the sequence counter are provided to the recipient. The sender sends compressed messages including the value of the sequence counter and not the frame counter and monitors for an acknowledgement of receipt by the recipient. When no acknowledgment is received, the sender sends uncompressed messages until an acknowledgement of receipt is received from the recipient. The sequence counter is incremented and the next value of the frame counter is established as the integer next larger than previous value of the frame counter which is congruent to the sequence counter modulo 256.

14 Claims, 8 Drawing Sheets

Related U.S. Application Data continuation of application No. 14/470,364, filed on Aug. 27, 2014, now Pat. No. 10,063,524, which is a continuation of application No. 12/549,075, filed on Aug. 27, 2009, now Pat. No. 8,855,308, which is a division of application No. 10/726,493, filed on Dec. 4, 2003, now Pat. No. 7,600,038.

(60) Provisional application No. 60/431,645, filed on Dec. 4, 2002, provisional application No. 60/431,078, filed on Dec. 4, 2002.

(51) Int. Cl.
| | | |
|---|---|---|
| *H04W 12/033* | (2021.01) | |
| *H04W 12/02* | (2009.01) | |
| *H04L 29/08* | (2006.01) | |
| *H04L 12/801* | (2013.01) | |
| *H04W 12/04* | (2021.01) | |
| *H04W 56/00* | (2009.01) | |
| *H04W 4/12* | (2009.01) | |
| *H04W 24/00* | (2009.01) | |
| *H04W 28/04* | (2009.01) | |
| *H04W 28/06* | (2009.01) | |
| *H04L 9/40* | (2022.01) | |
| *H04L 67/04* | (2022.01) | |
| *H04L 67/12* | (2022.01) | |
| *H04L 47/34* | (2022.01) | |
| *H04L 69/329* | (2022.01) | |

(52) U.S. Cl.
CPC ............ *H04L 1/1867* (2013.01); *H04L 29/06* (2013.01); *H04L 47/34* (2013.01); *H04L 63/0435* (2013.01); *H04L 63/06* (2013.01); *H04L 67/04* (2013.01); *H04L 67/12* (2013.01); *H04W 12/02* (2013.01); *H04W 12/033* (2021.01); *H04W 12/04* (2013.01); *H04W 56/0015* (2013.01); *H04L 69/329* (2013.01); *H04L 2209/80* (2013.01); *H04W 4/12* (2013.01); *H04W 24/00* (2013.01); *H04W 28/04* (2013.01); *H04W 28/06* (2013.01)

(58) Field of Classification Search
CPC ....... H04L 1/1867; H04L 29/06; H04L 47/34; H04L 67/04; H04L 67/12; H04L 69/329; H04L 2209/80; H04W 56/0015; H04W 4/12; H04W 24/00; H04W 12/033; H04W 12/02; H04W 12/04; H04W 28/04; H04W 28/06
See application file for complete search history.

(56) References Cited

U.S. PATENT DOCUMENTS

| | | | |
|---|---|---|---|
| 5,319,712 | A | 6/1994 | Finkelstein et al. |
| 5,422,894 | A | 6/1995 | Abe et al. |
| 5,912,972 | A | 6/1999 | Barton |
| 6,272,633 | B1 * | 8/2001 | Duke ...................... H04K 1/00 380/217 |
| 6,377,558 | B1 | 4/2002 | Dent |
| 6,498,936 | B1 | 12/2002 | Raith |
| 6,873,621 | B2 | 3/2005 | Kamoi et al. |
| 6,909,887 | B2 | 6/2005 | Fauconnier et al. |
| 7,209,560 | B1 | 4/2007 | Fairman et al. |
| 7,600,038 | B2 | 10/2009 | Struik |
| 8,855,308 | B2 * | 10/2014 | Struik .................... H04L 47/34 380/261 |
| 10,063,524 | B2 | 8/2018 | Struik |
| 10,673,829 | B2 | 6/2020 | Struik |
| 2001/0006552 | A1 | 7/2001 | Salokannel |
| 2002/0025820 | A1 | 2/2002 | Fauconnier et al. |
| 2002/0181475 | A1 | 12/2002 | Dove et al. |
| 2004/0136527 | A1 * | 7/2004 | Struik .................... H04L 47/34 380/28 |
| 2018/0367512 | A1 | 12/2018 | Struik |

OTHER PUBLICATIONS

"Draft of Clause 7 for TG3-MAC"; Project: IEEE P802.15 Wireless Personal Area Networks; Online Jan. 2001, XP002280534; Retrieved from the internet: May 14, 2004 <http://grouper.ieee.org/groups/802/15/pub/2001/Jan01/01034r0P802-15_TG3-MAC-Clause7-Draft-Text.doc>, 25 pages.

Lipmaa et al., "Comments to NIST Concerning AES-modes of Operations: CTR-mode Encryption"; In Symmetric Key Block Ciper Modes of Operation Workshop; Baltimore, Maryland; Oct. 20, 2000, 4 pages.

"MAC Distributed Security Proposal"; Project: IEEE P802.15 Working Group for Wireless Personal Area Networks (WPANS); Online Jul. 2002, XP002280537; Retrieved from the internet: May 14, 2004 <http://grouper.ieee.org/groups/802/15/pub/2002/Jul2002/02221r2P802-15_TG4-MAC-Distributed-Security-Proposal.ppt>, 73 pages.

Rogaway, "Authenticated-Encryption with Associated-Data"; Proceedings of the 9th ACM Conference on Computer and Communications Security (CCS-9); Nov. 17-21, 2002, Retrieved from the internet <http://www.cs.ucdavis.edu/~rogaway/papers/ad.html, 3 pages.

Singer, "Introduction to the IEEE 802.15.3 Security Architecture"; Online Mar. 19, 2002, XP00280535; Retrieved from the internet: May 17, 2004 <http://www.securemulticast.org/GSEC/gsec3_ietf53_Singer.pdf>, 23 pages.

Tanenbaum, A.S.; Computer Networks; 3rd Edition; 1996, 23 pages.

Non-Final Office Action issued in U.S. Appl. No. 14/470,364 dated Jul. 28, 2017, 10 pages.

Final Office Action issued in U.S. Appl. No. 14/470,364 dated Feb. 7, 2018, 9 pages.

Notice of Allowance issued in U.S. Appl. No. 14/470,364 dated May 1, 2018, 7 pages.

Office Action issued in Canadian Application No. 2,508,485 dated Oct. 19, 2011, 3 pages.

Office Action issued in Canadian Application No. 2,508,485 dated May 29, 2012, 3 pages.

Office Action issued in Canadian Application No. 2,508.485 dated Jan. 11, 2013, 2 pages.

Notice of Allowance issued in Canadian Application No. 2,508,485 dated Aug. 21, 2013, 1 page.

Communication Pursuant to Article 94(3) EPC issued in European Application No. 03779608.3 dated Feb. 7, 2007, 5 pages.

Communication Pursuant to Article 94(3) EPC issued in European Application No. 03779608.3 dated Jun. 18, 2010, 6 pages.

Communication Pursuant to Article 94(3) EPC issued in European Application No. 03779608.3 dated Apr. 18, 2017, 4 pages.

Communication under Rule 71(3) EPC issued in European Application No. 03779608.3 dated Oct. 30, 2018, 31 pages.

Extended European Search Report issued in European Application No. 19166407.7 dated Jul. 11, 2019, 42 pages.

PCT International Search Report in International Application No. PCT/CA2003/001879, dated Jun. 2, 2004, 4 pages.

* cited by examiner

| Sender Frame Counter | Message | Recipient Frame Counter |
|---|---|---|
| 270 | 270 | 270 |
| 271 | 15 | 271 |
| 272 | 16 | 272 |
| 273 | 17 | 273 |
| ... | ... | ... |

Figure 5

| Sender Frame Counter | Message / ACK | Recipient Frame Counter |
|---|---|---|
| 7 | 7 → <br> ← 7 | 7 |
| 258 | 2 → <br> ← 2 | 258 |
| 289 | 33 → | 258 |
| 289 | 289 → <br> ← 33 | 289 |
| 290 | 34 → <br> ← 34 | 290 |

| Sender Frame Counter | Message ► | | Recipient Frame Counter |
|---|---|---|---|
| 7 | 7 | | 7 |
| 258 | 2 | loss | |
| 288 | 288 Uncompressed | | 288 |
| 289 | 33 | | 289 |
| 547 | 547 Uncompressed | loss | |
| 601 | 89 | | 289 |
| 805 | 805 Uncompressed | | 805 |

| Sender Frame Counter | ←—Message—→ | | Recipient Frame Counter |
|---|---|---|---|
| 7 | 7 | | 7 |
|  | 7 | ACK |  |
| 288 | 2 | loss |  |
| 288 | 32 |  | 7 Enable error flag due to decryption error |
|  | 32 | ACK |  |
| 289 | 33 | reject due to error flag |  |
| 290 | 34 | NAK (due to error flag) | Message sent with ACK request |
| 290 | 290 |  | 290 Disable error flag; frame counter OK |
|  | 290 | ACK |  |

Figure 10

METHOD AND APPARATUS FOR ENCODING SECURITY STATUS INFORMATION

CROSS-REFERENCE TO RELATED APPLICATIONS

This application is a continuation application of U.S. application Ser. No. 16/113,518 filed on Aug. 27, 2018, which is a continuation application of U.S. application Ser. No. 14/470,364 filed on Aug. 27, 2014, which is a continuation application of U.S. application Ser. No. 12/549,075 filed on Aug. 27, 2009, which is a divisional application of U.S. application Ser. No. 10/726,493 filed on Dec. 4, 2003 and issued as U.S. Pat. No. 7,600,038 on Oct. 6, 2009, which claims priority from U.S. Provisional Application No. 60/431,078 filed on Dec. 4, 2002 and U.S. Provisional Application No. 60/431,645 filed on Dec. 5, 2002 all of which are hereby incorporated by reference.

The present invention relates to a method and apparatus for encoding security status information.

DESCRIPTION OF THE PRIOR ART

Low rate personal wireless networks are used with small devices with transmission speeds of up to 250 kilobits per second. These devices typically have severe power constraints as they are operated on batteries. In many of these devices, such as battery-operated sensors, remote controls, car door openers and light switches, it is necessary to have long battery life. If the batteries die too quickly then the replacement cost can be equal to the cost of the product itself.

It is also desirable to have secure communications between such constrained devices to prevent abuse of the system. One technique is to encrypt data being sent between the devices. Encryption mathematically transforms the transmitted information using a secret key known only to the two parties who are communicating. Without the key, the message is unintelligible. However, this requires overhead in the message structure in order to allow the recipient to decrypt the data. The sender must indicate which key it has used, which algorithm it has used to encrypt, and input parameters of the encryption algorithm such as a counter.

Usually, a frame counter is used as one of the input parameters for freshness in the encryption. Freshness means that the parameters change for each communication and are thus not reused. One type of encryption called a block cipher breaks up a message into parts (blocks) of a fixed size. Various block ciphers are known such as DES (Data Encryption Standard) and AES (Advanced Encryption Standard). Block ciphers often use an input block as a seed when used in stream-cipher mode. This input block should not repeat in order to maintain data freshness and data confidentiality. In one approach, a frame counter and a key identifier are used as the input block and are indicated in the message that is sent. In addition, each message usually includes a sequence counter that is not used for security but rather to match the sending of a message with the acknowledgement thereof by the recipient. These messages typically include a data portion referred to as the payload which is about 20 bytes. Accordingly, a five byte overhead for security information represents a 25% overhead.

The amount of data transferred between such constrained devices is one of the principal factors in their battery life. Accordingly, it is desirable to reduce the amount of information transferred.

However, in order to maintain the security of the underlying encryption methods, the number of bits in the frame counter should not be reduced.

SUMMARY OF THE INVENTION

In accordance with one aspect of the present invention there is provided a method of encoding a frame counter used in communication between a sender and a receiver. The method comprises maintaining a sequence counter and a frame counter at the sender and computing new values of the frame counter such that the frame counter is unique and recoverable from an encoded value of the frame counter and the sequence counter.

In another aspect there is provided a method of transmitting messages from a sender to a recipient over a wireless channel, the messages including a sequence counter and a frame counter. The method comprises establishing initial values of the sequence counter and the frame counter at the sender. Initial values of the frame counter and the sequence counter are provided to the recipient. The sender sends compressed messages including the value of the sequence counter and not the frame counter and monitors for an acknowledgement of receipt by the recipient. When no acknowledgment is received, the sender sends uncompressed messages until an acknowledgement of receipt is received from the recipient. The sequence counter is incremented and the next value of the frame counter is established as the integer next larger than previous value of the frame counter which is congruent to the sequence counter modulo 256.

In yet another aspect, there is provided a method of transmitting messages from a sender to a recipient over a wireless channel, the messages including a sequence counter and a frame counter. The method comprises establishing initial values of the sequence counter and the frame counter at the sender and providing the initial values of the frame counter and the sequence counter to the recipient. The sender sends compressed messages including the value of the sequence counter and not the frame counter. Periodically the sender sends uncompressed messages including the value of the frame counter according to predefined criteria. The sender increments the sequence counter and establishes the next value of the frame counter as the integer next larger than previous value of the frame counter which is congruent to the sequence counter modulo 256.

In a further aspect, there is provided a wireless device for receiving communications from other wireless devices in a wireless network. The device comprises storage for a frame counter, a receiver for obtaining a message over the wireless network, the message including a sequence counter and data encrypted using a secret key and a new value of the frame counter as input to the encryption. The device includes a decryptor configured to perform decryption complementary to the encryption used in the message, the decryptor having access to the secret key. A processor is connected to the message receiver and configured to recover the value of the frame counter from a sequence counter in the message and provide the frame counter and encrypted data from the message to the decryptor.

In a yet further aspect, there is provided a wireless device for sending communications to other wireless devices in a wireless network. The device comprises storage for a frame counter and a sequence counter and a processor to compute a new value of the frame counter such that the frame counter is unique and recoverable from an encoded value of the frame counter and the sequence counter. The device further includes a transmitter for sending a message over the wireless network, the message including a sequence counter and data encrypted using a secret key and the new value of the frame counter as input to the encryption.

BRIEF DESCRIPTION OF THE DRAWINGS

These and other features of the preferred embodiments of the invention will become more apparent in the following detailed description in which reference is made to the appended drawings wherein:

FIG. 5 is a schematic representation of an information exchange by the correspondents of FIG. 1.

FIG. 6 is a schematic representation of an information interchange among the correspondents of FIG. 1.

FIG. 8 is a schematic representation of an information exchange between the correspondents of FIG. 1.

FIG. 10 is a schematic representation of the method used in FIG. 9.

DESCRIPTION OF THE PREFERRED EMBODIMENTS

Figure 1:
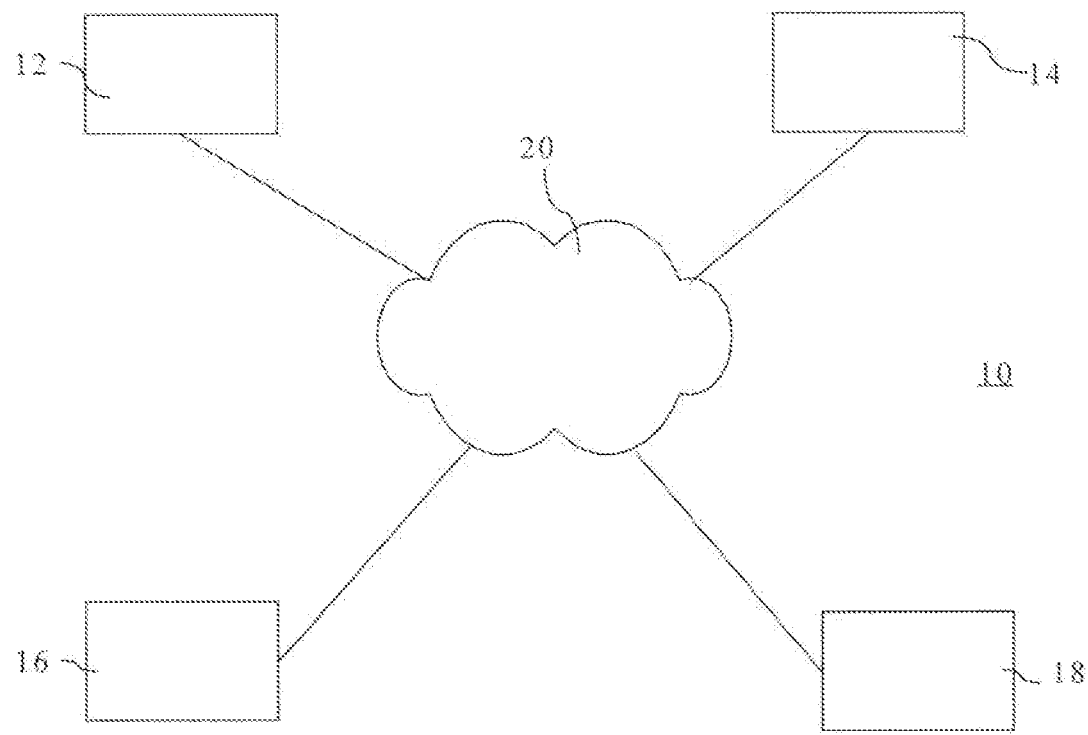
FIG. 1 is a schematic representation of a communication system.
Figure 2:
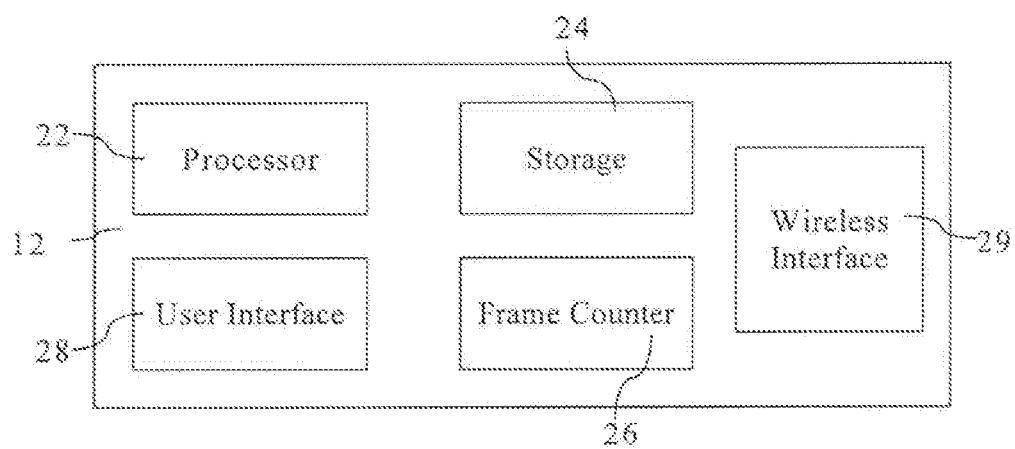
FIG. 2 is a more detailed view of a correspondent in the communication system of FIG. 1.

As may be seen in FIGS. 1 and 2, a communication system 10 consists of correspondents 12, 14, 16, and 18 communicating over a wireless network 20. Correspondent 12 includes a processor 22, a storage medium 24, a frame counter 26, a user interface 28. The processor 22 and storage 24 may be provided in an integrated circuit. The frame counter 26 is used as input to an encryption method in the processor 22. The user interface 28 may be provided by a simple switch and an LED or by more sophisticated means such as a keyboard and a monitor or other display. Each correspondent includes a wireless network interface 29 which sends and receives signals at a predetermined radio frequency such as 2.4 GHz or 868 MHz/915 MHz. The correspondents can communicate directly with each other when they are in close enough proximity. The network 20 also provides wireless interfaces linked to routers, bridges, and other network hardware to provide connectivity beyond the range of wireless signals and to assist in establishing connections between physically close correspondents.

Figure 3:
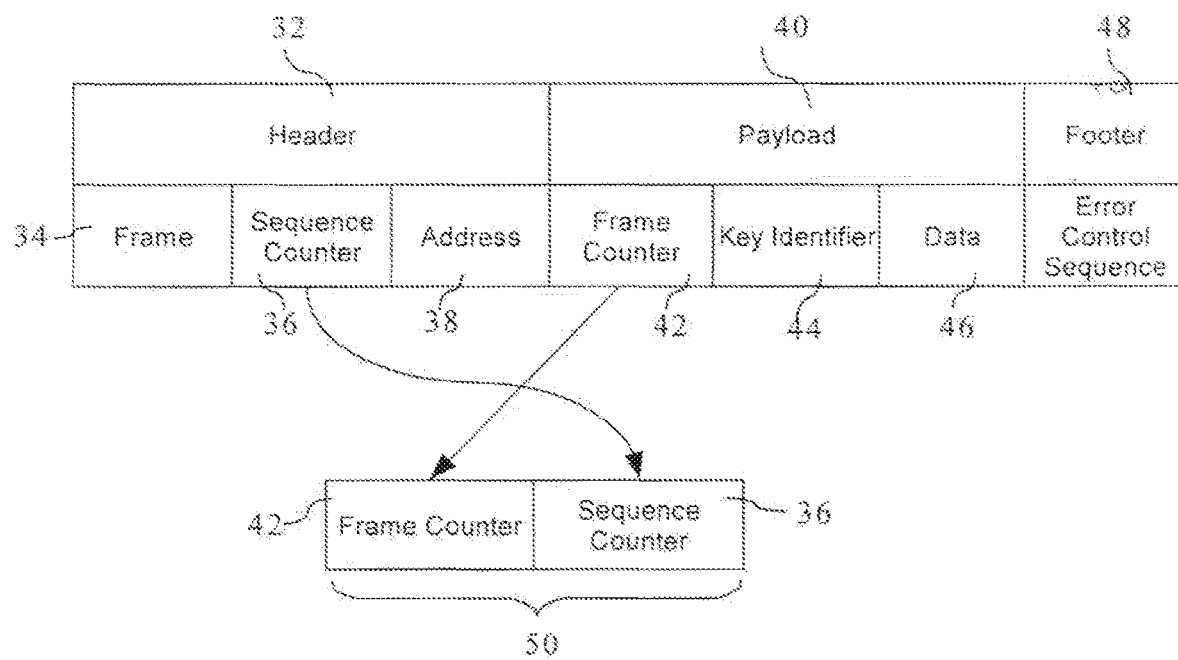
FIG. 3 is a schematic representation of a message packet used by the correspondents of FIG. 1.

The correspondents exchange messages using packets in the format shown in FIG. 3 by the numeral 30. The packet consists of three portions: a header 32, a payload 40, and a footer 48. The header 32 contains a frame control portion 34, a sequence counter 36 which is notated as DSN and addressing fields 38. The payload portion 40 contains the actual content of the message, and includes security status information and data 46. The security status information 42, 44 includes a compressed frame counter 42 and a key identifier 44. The footer portion 48 of the packet 30 includes an error control sequence. As shown in FIG. 2, the compressed frame counter 42 and the sequence counter 36 together form the frame counter 50.

In operation, the header is used to direct the packet to its intended address using the addressing fields. At the recipient, the footer is used to perform error correction and to ensure that the message has been received intact. In addition, the recipient may acknowledge the message. The acknowledgement will include the sequence counter DSN. The sequence counter is used to match sent messages with their acknowledgements. The security status information includes a frame counter which is used as input to a decryption method at the recipient. The decryption method is then used to decode the data and recover the original data sent by the sender.

In order to reduce the amount of information transferred, the frame counter is specially encoded. This encoding is accomplished by updating the frame counter N to a value of $N_0 \geq N$ such that $N_0 \min\{N^1 \geq N$ such that $N'=DSN \bmod 256\}$. The frame counter can then be represented as 3 byte encoded frame counter portion with the sequence counter DSN appended thereto. Accordingly, it is only necessary to transmit 3 bytes in the payload portion to communicate the frame counter rather than the full length of 4 bytes.

Figure 4:
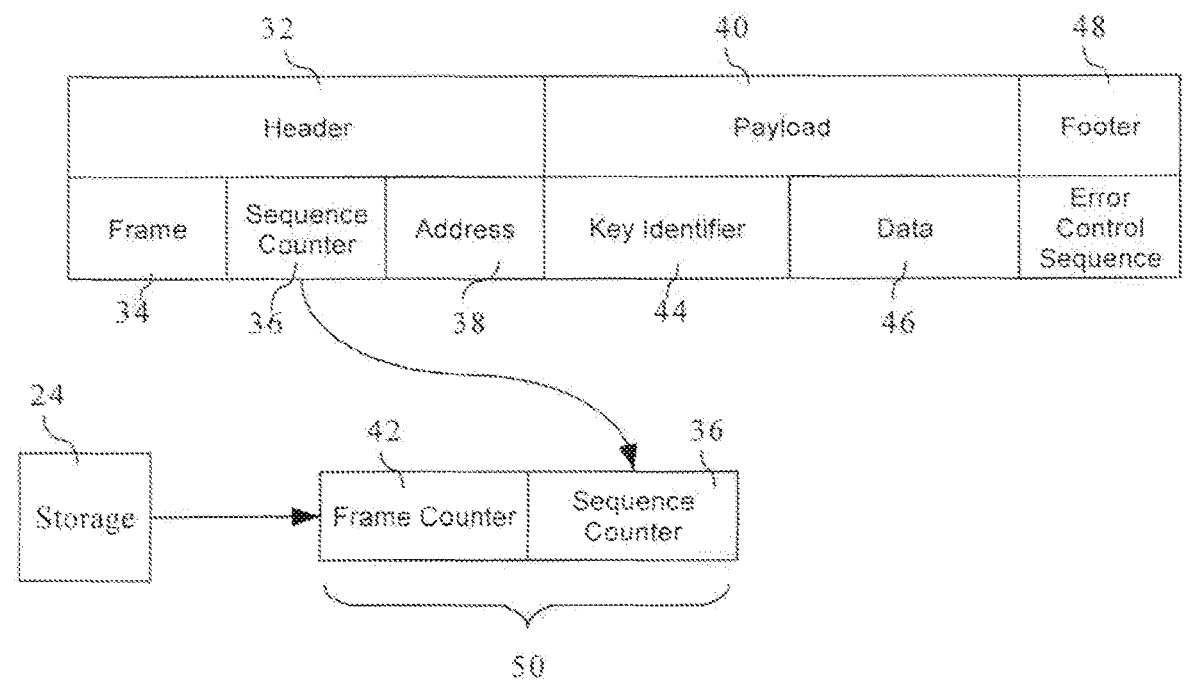
FIG. 4 is a schematic representation of another embodiment of a message packet.

In another embodiment, further reduction in the information transferred may be achieved by omitting the frame counter altogether from the payload as seen in FIG. 4. The sequence counter DSN is then used to recover the new value of the frame counter by combining the previous value of the frame counter 42 in storage 24 with the value of the sequence counter. In this embodiment, the message is compressed by removing the frame counter entirely.

Referring therefore to FIG. 5, a simplified information exchange between one sender and one recipient is shown. The sender begins with a frame counter of 270. The sender transmits the frame counter 270 to the recipient. The recipient is then initialised to the beginning value of 270. For each further communication, the sequence counter is incremented. Accordingly, the next message has a sequence counter of 15 and a frame counter of 271. The sender sends the value of the sequence counter, which is 15 and equal to 271 mod 256, to the recipient. The recipient then updates the frame counter with the integer next larger to 270 which is congruent to 15 mod 256, in this case the value 271. Each sequential communication proceeds similarly with the sequence counter being incremented. Accordingly, the next transmission of a frame counter 272 is accomplished by transmitting the sequence counter of 16. The recipient may then recover the value 272 of the frame counter from the sequence counter 16 and the previous frame counter 271.

In typical use, the sender will be communicating with several recipients and accordingly the messages may be spaced out in time. There may be intervening messages to other recipients which necessitate incrementing the sequence control DSN between messages to any given recipient. Accordingly, the consecutive structure shown in FIG. 5 may not always be present. The communication may proceed as shown in FIG. 6 by the numeral 70. In this case, the frame counter begins at 7, which is sent to the first recipient which sets its frame counter to 7. In this example some time passes before the next message is transmitted to the first recipient. In this case, the next message is transmitted with a frame counter of 258 indicating that 250 other messages have been transmitted to other recipients by the sender in the interim. The value 258 is transmitted by sending the sequence counter, which is 258 mod 256=2. The recipient then recovers 258 as the integer next larger than 7 which is congruent to 2 mod 256. The next message is transmitted with a frame counter of 289 which is transmitted by sending the sequence counter of 33. However, in this case, the recipient does not acknowledge receipt of this message. The non-acknowledgement may occur for a number of reasons including simply not receiving the message or a failure in the error control. Accordingly, the recipient's frame counter remains at 258. Since the message is not acknowledged, the sender retransmits the full value 289 of the frame counter. This retransmission resets the frame counter at the recipient to the value 289 and the recipient acknowledges with the value 33=289 mod 256. The final message sent immediately following the third message is 290, which is communicated by sending the sequence counter of 34 which is 290 mod 256. The recipient updates its frame counter to 290 and acknowledges receipt of the value 34.

In the above example, the recipient always acknowledges messages from the sender. Accordingly, the sender is immediately notified that a message has not been received because it does not receive an acknowledgement. In this case, the sender can send a full message to resynchronise transmission.

Figure 7:
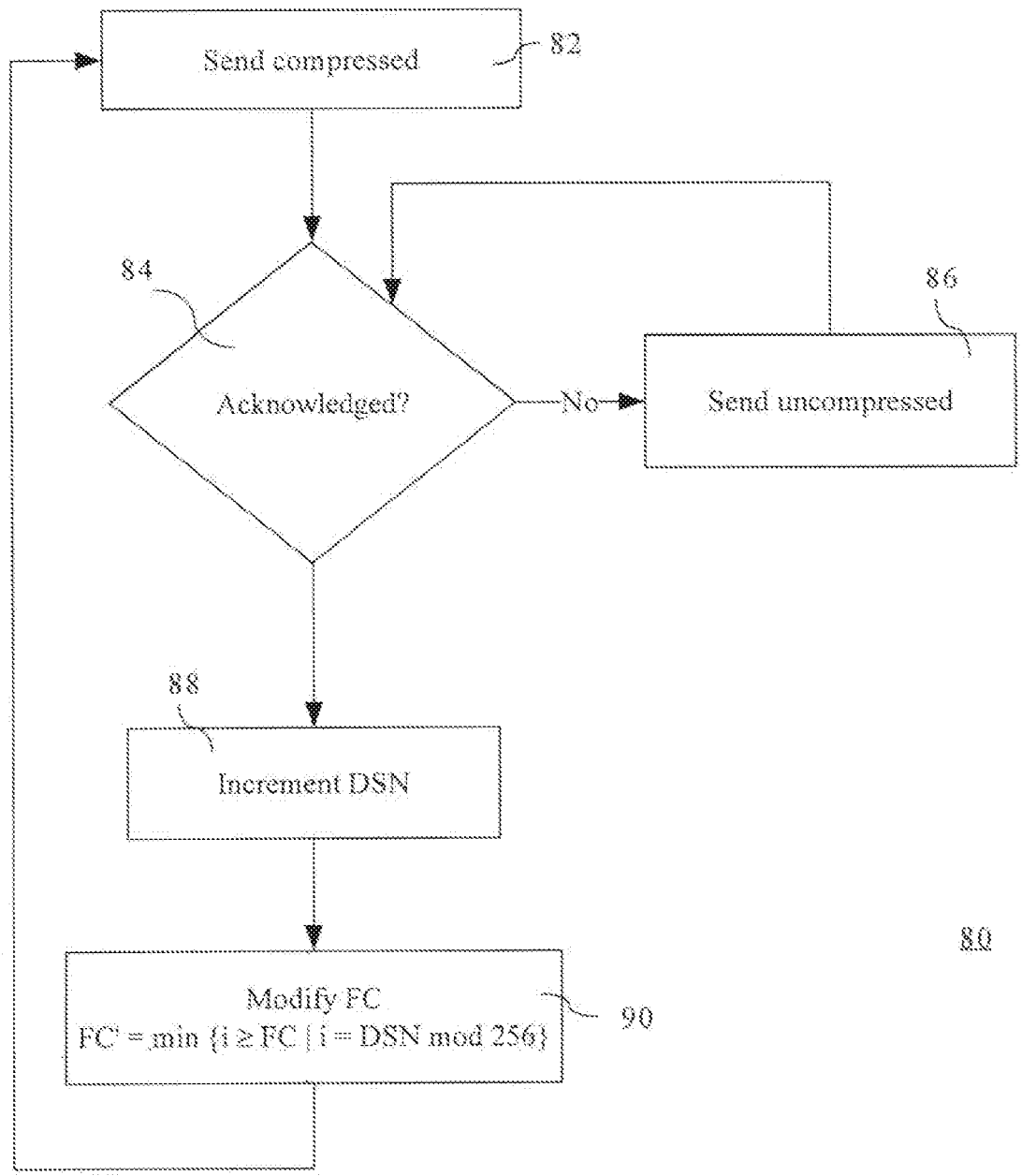
FIG. 7 is a schematic representation of the method used in FIG. 6.

Referring to FIG. 7, the steps of the above method are shown generally by the numeral 80. The sender first sends a compressed message at step 82. The compressed message includes the value of the sequence counter and not the frame counter. Upon receipt of the compressed message, the recipient updates its frame counter as the minimum value larger than the current frame counter which is congruent to the sequence counter modulo 256. If the message is acknowledged at step 84 then execution continues. Otherwise, the sender repeatedly sends uncompressed messages at step 86 until one of these is acknowledged. The uncompressed messages include the frame counter. Upon receipt of the uncompressed message, the recipient updates its frame counter to the value of the frame counter in the uncompressed message. Once the message is acknowledged, the sender increments the sequence counter for the next message at step 88. It is particularly expedient to increment the sequence counter by 1, however it will be recognized that other method of updates the sequence counter may be used by the sender. The sender then establishes the frame counter for the next message as the minimum value larger then the current frame counter which is congruent to the sequence counter modulo 256.

In an alternative embodiment, the recipient does not acknowledge messages received. The sender continues to transmit regardless of whether the messages are actually received. Accordingly, it is necessary for the sender to occasionally send uncompressed messages containing the value of the frame counter in case a loss of synchronisation has occurred. Referring therefore to FIG. 8, the messages transmitted by the sender arc shown generally by the numeral 100. The first message reaches the recipient and accordingly both the sender and the recipient have frame counters of 7. However, the second message is lost during transmission. Accordingly, the recipient's frame counter is not updated. The third message is an uncompressed message and accordingly, updates the recipient's frame counter to 288, regardless of the earlier loss of synchronisation. The fourth message 289 is sent with the sequence counter of 33 and not the frame counter. This updates the recipient's frame counter to 289. The fifth message 547 is lost during the transmission, and accordingly the recipient's frame counter is incorrect. The next message 601 is transmitted as the sequence counter of 89, which results in an incorrect frame counter at the recipient since the computation yields the value 345 which is congruent to 89 modulo 256 but differs by 256 from the value of the frame counter in the sender. The incorrect frame counter results in a failure of decryption. Upon discovering the failure, the recipient maintains its frame counter of 289 rather than updating the frame counter to the incorrect value. The final message 805 is sent as an uncompressed message which updates the recipient's frame counter to the correct value again.

Figure 9:
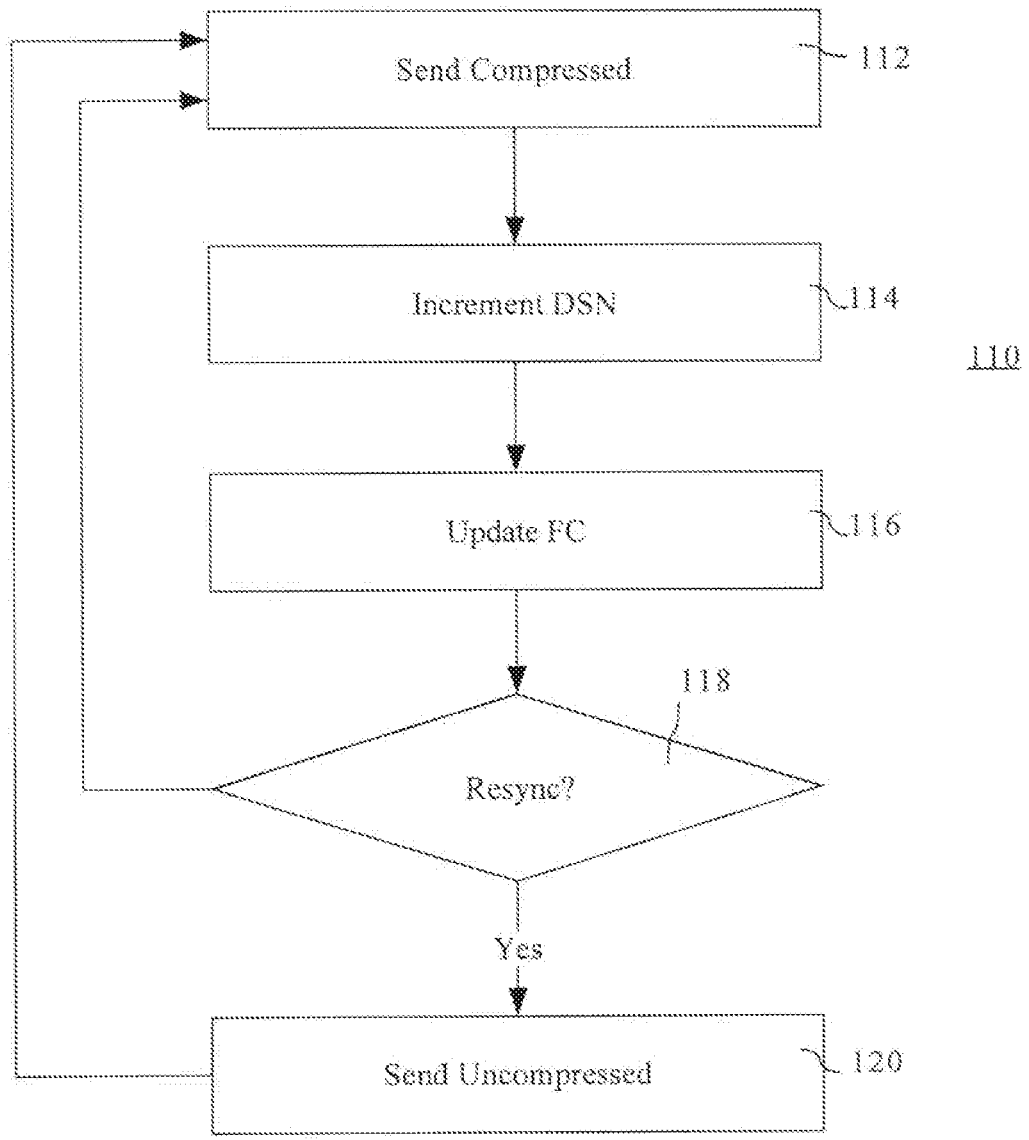
FIG. 9 is a schematic representation of the method used in FIG. 8.

The steps performed in the example of FIG. 8 are shown schematically in FIG. 9 by the numeral 10. The sender first sends a compressed message at step 12. The sender then increments the sequence control at step 114 then updates the frame counter at step 116. The sender then checks to see if it is time for resynchronisation at step 118. Resynchronisation can be performed at periodic intervals such as every 2, 3, 4 . . . , 10 transmissions. When the resync is required, the sender sends an uncompressed message at step 120, otherwise the sender proceeds to send compressed messages at step 112. It will be recognized that the sender independently decides which messages to send uncompressed. The sender cannot be guided by the recipient in this choice since there is no feedback from the recipient.

In a further embodiment, the recipient occasionally acknowledges messages. Furthermore, the sender may indicate in the header of a sent message that this message should be acknowledged. The recipient can therefore use such messages to indicate that a loss of synchronisation has occurred. Referring therefore to FIG. 10, a transmission is shown by the numeral 130. The first message 7 is sent and is acknowledged by the recipient. Both the sender and the recipient have frame counters of 7. The second frame counter 258 is communicated by sending the sequence counter of 2 and is lost during transmission. The third message 288 is sent as the sequence counter of 32. The recipient acknowledges receipt of the sequence counter 32 however, during the subsequent decryption, the recipient has an error since its frame counter is out of sync with the sender since the reconstructed value is 32 rather than 288. Accordingly, the recipient enables an error flag. The next message 289 is sent as the sequence counter of 33, but is rejected by the recipient due to the error flag. Another message with a frame counter of 290 is sent to the recipient as the sequence counter of 34 and with a request for acknowledgement embedded in tie message. When a recipient receives this message, it does not acknowledge since the error flag is set. Therefore, the sender resends the message with the frame counter of 290 as an uncompressed message which resynchronizes the frame counters of the sender and the recipient again. The recipient then acknowledges receipt of the message with frame counter 290. The error flag indicates that a decryption error occurred and that synchronization must be established by received an uncompressed message including the frame counter, rather than a compressed message without the frame counter. It will be recognized that loss of synchronization may occur in this embodiment, but the synchronization is re-established with a delay of at most one acknowledged message.

Figure 11:
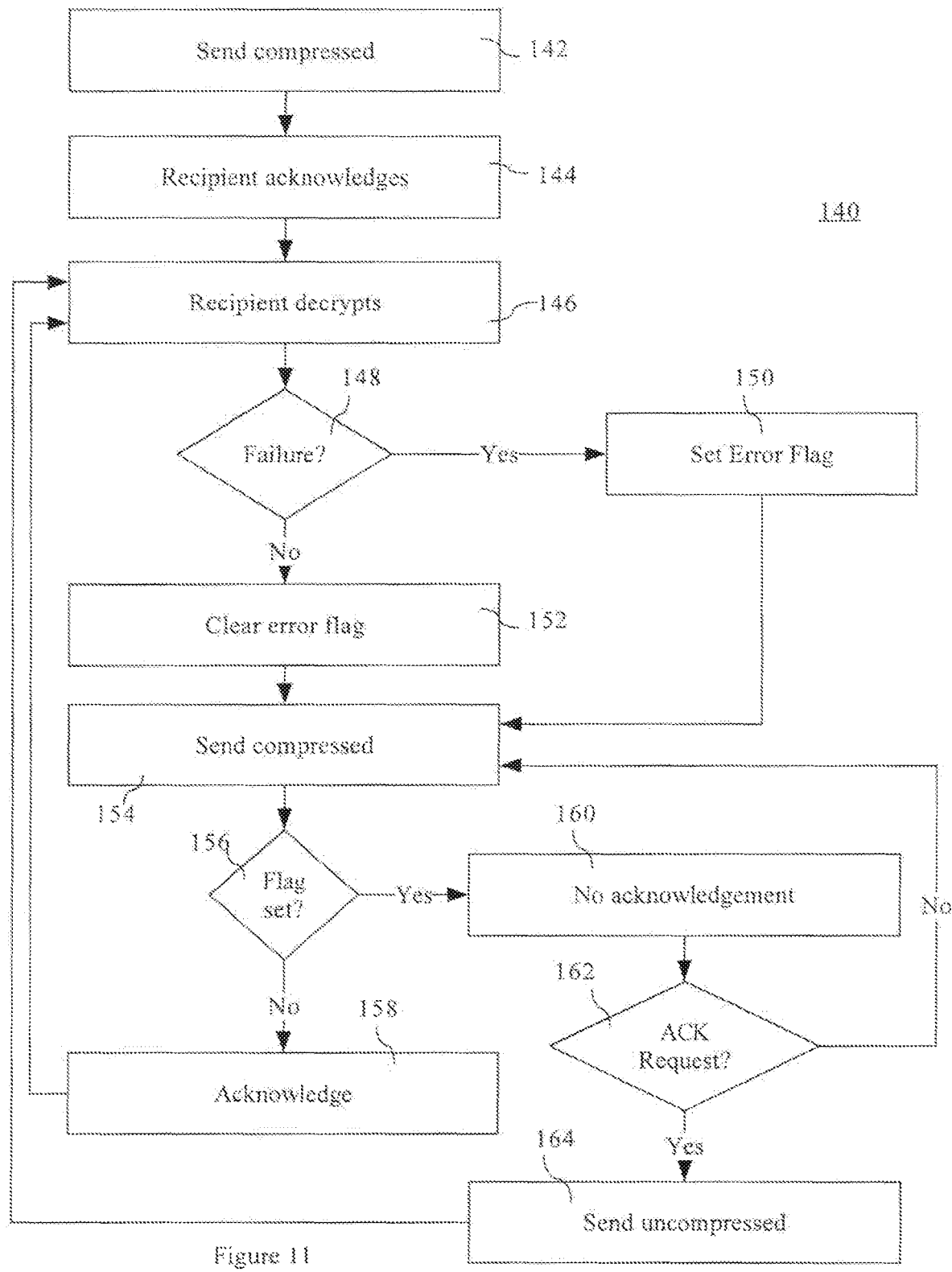
FIG. 11 is a schematic representation of another information exchange between the correspondents of FIG. 1.

Referring to FIG. 11, the steps of this embodiment are shown schematically by the numeral 140. The sender first sends a compressed message at step 142. The recipient then acknowledges receipt of the uncompressed message at step 144. The recipient attempts to decrypt the message at step 146. If there is a failure during decryption at step 148, then the recipient sets an error flag at step 150. If there is no failure and the error flag is set, then the recipient clears the error flag at step 152. The sender then sends another compressed message at step 154. When the recipient receives the message, it checks to see if the error flag is set at step 156. If the error flag is not set, then the recipient acknowledges the message at step 158 and proceeds with decryption by steps 146 onward. If the flag is set, then the recipient does not acknowledge the message at step 160. If the message was sent with an acknowledgment request at step 162, then the sender detects this and sends an uncompressed message at step 164, and execution returns to the decryption step 146. If no acknowledgement request was sent, then the sender proceeds to send compressed messages at step 154.

It will be recognised that in these embodiments, a reduction in the amount of data transferred is achieved. The reduction is realized by maintaining frame counters at both the sender and the recipient. The inventor has recognized that the recipient can reconstruct the correct value of the frame counter from partial information received from the sender in combination with the recipient's local copy of the information. Furthermore, a recovery mechanism is provided which re-synchronizes frame counters that end up out-of-synchronization. It will be recognized that the recovery mechanism allows the compression technique to be applied in a robust manner.

It will be recognized that the above techniques are not limited to use with integers but rather may be used with counters that are elements of a finite set with a partial ordering. Furthermore, although the technique has been described in the particularly advantageous setting of a cryptographic system, it may be applied in other settings where counters are used and where a reduction in communication cost is at a premium. One example of such a setting is the inclusion of frame counters to facilitate detection of duplicate transmission.

Although the invention has been described with reference to certain specific embodiments, various modifications thereof will be apparent to those skilled in the art without departing from the spirit and scope of the invention as outlined in the claims appended hereto.

What is claimed is:

1. A method, comprising:
   storing, by a wireless device, a local value of a frame counter, wherein the local value of the frame counter was used to decrypt data in a first message;
   receiving, by the wireless device and over a wireless network, a second message after the first message, wherein the second message includes a sequence counter value identifying the second message and data encrypted with a secret key;
   determining, by the wireless device, a new value of the frame counter from the local value of the frame counter and the sequence counter value in the second message; and
   decrypting, by the wireless device, the second message based on the new value of the frame counter.

2. The method of claim 1, wherein the new value of the frame counter is an integer that is next larger than the local value of the frame counter and congruent to the sequence counter value modulo a specified integer.

3. The method of claim 1, wherein the sequence counter value comprises a compressed representation of the new value of the frame counter.

4. The method of claim 1, further comprising: sending an acknowledgement message in response to receiving the second message.

5. The method of claim 4, wherein the acknowledgment message includes the sequence counter value.

6. The method of claim 1, further comprising:
   detecting a decryption error based on a loss of synchronization of the frame counter; and
   setting an error flag based on the detecting of the decryption error, the error flag indicating the loss of synchronization of the frame counter.

7. The method of claim 6, further comprising: removing the error flag upon receiving a third message that includes a current value of the frame counter.

8. A non-transitory computer readable medium storing instructions to cause a processor to perform operations comprising:
   storing, by a wireless device, a local value of a frame counter, wherein the local value of the frame counter was used to decrypt data in a first message;
   receiving, by the wireless device and over a wireless network, a second message after the first message, wherein the second message includes a sequence counter value identifying the second message and data encrypted with a secret key;
   determining, by the wireless device, a new value of the frame counter from the local value of the frame counter and the sequence counter value in the second message; and
   decrypting, by the wireless device, the second message based on the new value of the frame counter.

9. The non-transitory computer readable medium of claim 8, wherein the new value of the frame counter is an integer that is next larger than the local value of the frame counter and congruent to the sequence counter value modulo a specified integer.

10. The non-transitory computer readable medium of claim 8, wherein the sequence counter value comprises a compressed representation of the new value of the frame counter.

11. The non-transitory computer readable medium of claim 8, the operations further comprising: sending an acknowledgement message in response to receiving the second message.

12. The non-transitory computer readable medium of claim 11, wherein the acknowledgment message includes the sequence counter value.

13. The non-transitory computer readable medium of claim 8, the operations further comprising:
   detecting a decryption error based on a loss of synchronization of the frame counter; and
   setting an error flag based on the detecting of the decryption error, the error flag indicating the loss of synchronization of the frame counter.

14. The non-transitory computer readable medium of claim 13, the operations further comprising: removing the error flag upon receiving a third message that includes a current value of the frame counter.

* * * * *